US 8,074,018 B2

(12) United States Patent
Kawada et al.

(10) Patent No.: US 8,074,018 B2
(45) Date of Patent: Dec. 6, 2011

(54) DISK ARRAY APPARATUS, AND CONTROL METHOD AND CONTROL PROGRAM RECORDING MEDIUM

(75) Inventors: Takashi Kawada, Kawasaki (JP); Osamu Kimura, Kawasaki (JP); Koji Yamaguchi, Kawasaki (JP); Kazuo Nakashima, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 11/723,153

(22) Filed: Mar. 16, 2007

(65) Prior Publication Data

US 2007/0233951 A1  Oct. 4, 2007

(30) Foreign Application Priority Data

Mar. 31, 2006 (JP) .................................. 2006-100022
Nov. 21, 2006 (JP) .................................. 2006-314744

(51) Int. Cl.
*G06F 12/00* (2006.01)
(52) U.S. Cl. ................. 711/114; 714/175; 714/E12.019
(58) Field of Classification Search ........................ None
See application file for complete search history.

(56) References Cited

U.S. PATENT DOCUMENTS

| 6,209,060 | B1 * | 3/2001 | Machida .................... 711/114 |
| 2002/0046265 | A1 | 4/2002 | Suzuki |
| 2005/0055530 | A1 * | 3/2005 | Wu et al. .................... 711/203 |
| 2005/0188170 | A1 * | 8/2005 | Yamamoto .................... 711/170 |
| 2006/0259756 | A1 * | 11/2006 | Thompson et al. ............... 713/2 |

FOREIGN PATENT DOCUMENTS

| JP | 09-305383 | 11/1997 |
| JP | 2001-202224 | 7/2001 |
| JP | 2002-91719 | 3/2002 |
| JP | 2005-071042 | 3/2005 |

* cited by examiner

*Primary Examiner* — Reginald Bragdon
*Assistant Examiner* — Thanh Vo
(74) *Attorney, Agent, or Firm* — Staas & Halsey LLP

(57) ABSTRACT

A disk array apparatus has a plurality of the same type of disk array units. Each of the disk array units has a plurality of storage areas in each of which firmware for allowing the disk array unit to operate is stored. When the disk array apparatus recognizes that a first disk array unit has been disposed therein, it compares a version number of firmware stored in each storage area included in the first disk array unit with a version number of firmware stored in each storage area included in a second disk array unit that currently operates in the disk array apparatus. If these version numbers are the same, the disk array apparatus makes a storage area in which firmware executed by the first disk array unit is stored conform to a storage area in which firmware executed by the second disk array unit is stored.

3 Claims, 13 Drawing Sheets

DISK ARRAY APPARATUS, AND CONTROL METHOD AND CONTROL PROGRAM RECORDING MEDIUM

BACKGROUND OF THE INVENTION

1. Field of the Invention

The present invention relates to a disk array apparatus, and, more particularly, to a maintenance technique for use when a disk array unit in the disk array apparatus is replaced.

2. Description of the Related Art

A disk array apparatus has a plurality of disk array units. Each of the disk array units stores firmware for achieving the function of the disk array unit, and executes the stored firmware, whereby the disk array apparatus operates. If a failure occurs in one of the disk array units in the disk array apparatus, the entire disk array unit is required to be replaced.

A disk array apparatus has a plurality of redundant disk array units for achieving the same function, because it is required to maintain uninterrupted operation. In addition, the disk array apparatus is required to prevent degradation of its performance after a faulty disk array unit included therein is replaced. If one of the disk array units malfunctions, that is, does not fulfill its function, this causes degradation of performance of the disk array apparatus. In order to prevent the degradation, a replacement disk array unit is required to operate by executing its firmware whose version number is the same as that of disk array units that are operating in the disk array apparatus.

As a known method used when a replacement disk array unit is disposed in a disk array apparatus, there is a firmware download method of making the version number of firmware stored in the replacement disk array unit conform to that of firmware stored in disk array units that are operating in the disk array apparatus. For example, a first disk array unit storing firmware and disposed in the disk array apparatus is replaced with a second disk array unit in the following manner. First, the version number of firmware stored in the second disk array unit is compared with that of firmware stored in a third disk array unit that is operating in the disk array apparatus. If the version numbers of a plurality of pieces of firmware stored in the second and third disk array units are not the same, the firmware stored in the third disk array unit is downloaded into a firmware storage area in the second disk array unit. The second disk array unit performs a predetermined operation by executing the firmware downloaded into its firmware storage area (see, for example, Japanese Unexamined Patent Application Publication No. 2005-71042).

If a malfunction occurs while a disk array apparatus is operating, it is required to recreate a situation in which the malfunction occurred in the disk array apparatus so as to investigate the cause of the malfunction. However, firmware that is not executed by a disk array unit is not taken into consideration in a known technique. Accordingly, a situation in which a malfunction occurred cannot be accurately recreated.

In addition, if a disk array apparatus having disk array units each capable of storing a plurality of pieces of firmware in its firmware storage area is restarted, each of the disk array units may execute firmware different from firmware which it executed before the disk array apparatus was restarted.

In order to overcome the above-described difficulties, it is an object of the present invention to make the version numbers of a plurality of pieces of firmware stored in functional disk array units in a disk array apparatus conform tot each other and make the version numbers of a plurality of pieces of firmware executed by the functional disk array units in the disk array apparatus conform to each other.

SUMMARY OF THE INVENTION

In order to achieve the above-described object, a disk array apparatus using a plurality of disk array units each storing a plurality of pieces of firmware is controlled in the following manner. The version numbers of a plurality of pieces of firmware stored in the disk array units that perform the same function are made to conform to each other. In addition, the version numbers of a plurality of pieces of firmware executed by the disk array units are made to conform to each other. Consequently, a plurality of pieces of firmware stored in the disk array units in the disk array apparatus and a plurality of pieces of firmware stored in a replacement disk array unit can be made to conform to each other. In addition, a plurality of pieces of firmware executed by the disk array units in the disk array apparatus and firmware executed by the replacement disk array unit can be made to conform to each other.

According to an embodiment of the present invention, the version numbers of a plurality of pieces of firmware stored in the replacement disk array unit and the version numbers of a plurality of pieces of firmware stored in the disk array units can be made to conform to each other. In addition, an identification number for a work (execution) area in storage unit included in the replacement disk array unit and identification numbers for work areas in storage unit included in the disk array units that are operating in the disk array apparatus can be made to conform to each other. Accordingly, there can be provided a disk array apparatus capable of preventing a replacement disk array unit to store firmware different from a plurality of pieces of firmware stored in a plurality of disk array units that are operating therein and to malfunction.

DESCRIPTION OF THE PREFERRED EMBODIMENT

Figure 1:
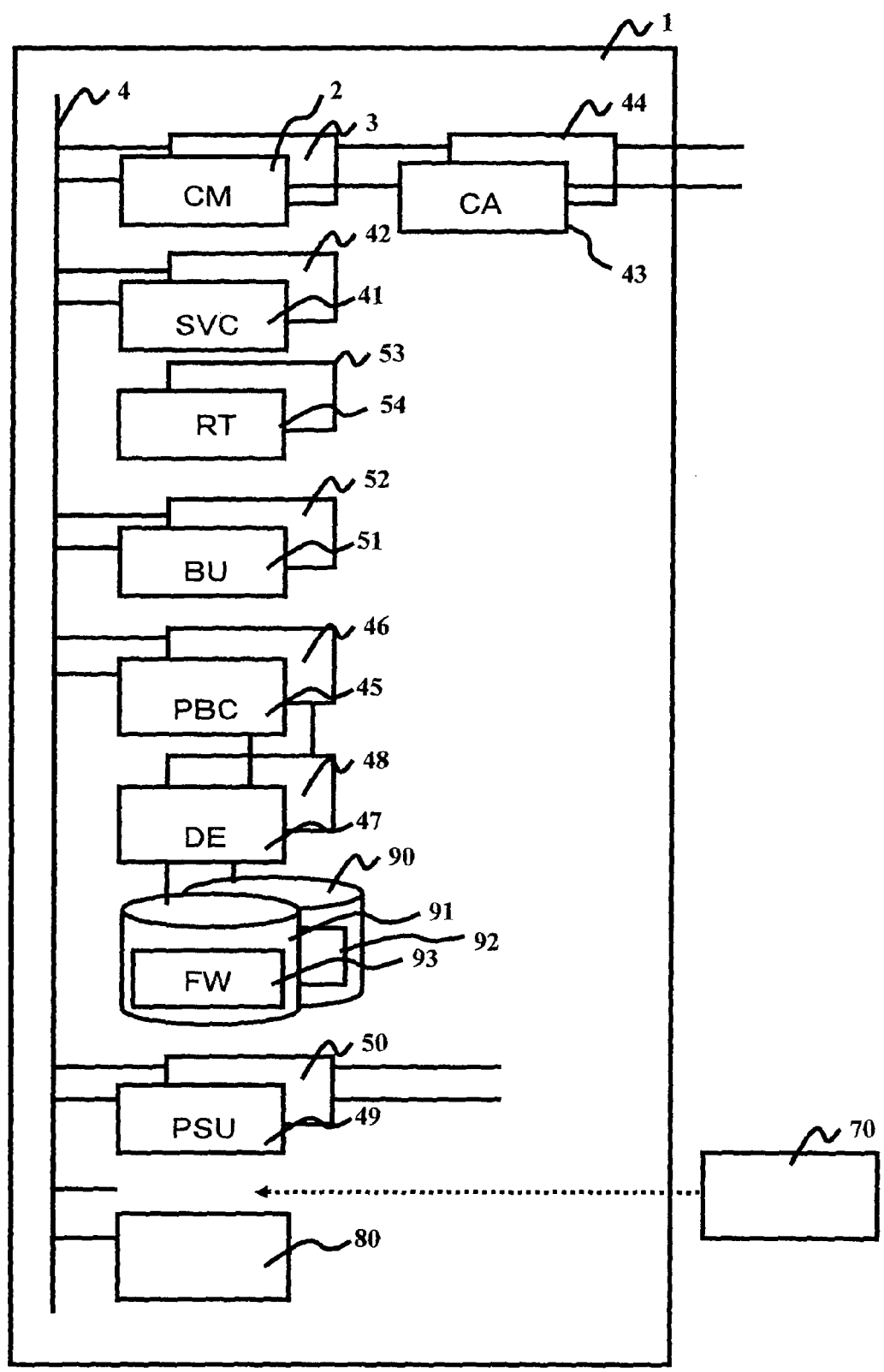
FIG. 1 is a diagram showing a configuration of a disk array apparatus according to an embodiment of the present invention.

FIG. 1 is a diagram showing a configuration of a disk array apparatus 1 according to an embodiment of the present invention. The following various types of disk array units are included in the disk array apparatus 1. A Controller Module (CM) 2 and a CM 3 perform overall control of the disk array apparatus 1. A SerVice Controller (SVC) 41 and an SVC 42 monitor and control the power supply of the disk array apparatus 1. A Channel Adapter (CA) 43 and a CA 44 perform data transmission and reception between the CM 2 and an external apparatus such as a host apparatus and between the CM 3 and the external apparatus, respectively. A Device Enclosure (DE) 47 and a DE 48 individually store a plurality of magnetic disk units. A Port Bypass Circuit (PBC) 45 and a PBC 46 control and monitor the DE 47 and the DE 48, respectively. A Power Supply Unit (PSU) 49 and a PSU 50 provide power for other disk array units. A Battery Unit (BU) 51 and a BU 52 provide power for other disk array units when a power failure occurs. A RouTer (RT) 53 and an RT 54 connect the CM 2 and the CM 3, and connect the CM 2 and the PBC 45, and the CM 3 and the PBC 46, respectively, so as to perform routing. The above-described disk array units are connected to each other via a bus 4.

The disk array apparatus 1 is required to always operate through in response to instructions transmitted from the host apparatus via the CA 43 and the CA 44. Accordingly, the disk array apparatus 1 has a plurality of redundant disk array units for executing the same function. For example, the disk array apparatus 1 has two Controller Modules, the CM 2 and the CM 3. Even if a failure occurs in one of the disk array units, the other disk array unit continuously operates, thereby preventing the operation of the disk array apparatus 1 from being stopped. The version numbers of a plurality of pieces of firmware stored in disk array units for executing the same function are made to conform to each other. In addition, the version numbers of a plurality of pieces of firmware executed by the disk array units are made to conform to each other. Furthermore, the version numbers of a plurality of pieces of firmware to be executed by the disk array units after the disk array units are restarted are made to conform to each other. Accordingly, the settings of the disk array units for executing the same function are identical. Firmware is software that is installed in a disk array unit to perform basic control of the disk array unit. The firmware is embedded in the disk array unit, and is not modified under normal conditions. The firmware is stored in a ROM or flash memory contained in the disk array unit. A version number is an identification number added to firmware when the firmware is upgraded. Many pieces of firmware are configured to be modified when an additional function is provided for a disk array unit or a malfunction in the disk array unit is corrected. Accordingly, if a disk array unit executes firmware having a version number different from firmware executed by another disk array unit, these disk array units perform different processing tasks.

The disk array apparatus 1 has system disks 90 and 91 in the magnetic disk units included in the DE 48 and the DE 47, respectively. The system disks 90 and 91 store firmware files 92 and 93 to be downloaded into each disk array unit included in the disk array apparatus 1, respectively. Accordingly, a plurality of redundant system disks and a plurality of redundant firmware files are included in the disk array apparatus 1. Each disk array unit functions by performing an operation in accordance with a set of commands stored in the downloaded firmware. A plurality of pieces of firmware having various version numbers are stored in the firmware file 92. Accordingly, the firmware file 92 includes a plurality of pieces of firmware having various version numbers for the same disk array unit. The disk array units included in the disk array apparatus 1 can be classified into either of two types. A disk array unit of one type has a work (execution) area in storage unit into which firmware can be downloaded. On the other hand, a disk array unit of the other type has a work area in storage unit into which firmware cannot be downloaded. Here, a replacement disk array unit is defined as a disk array unit 70, and a disk array unit operating in the disk array apparatus 1 is defined as a disk array unit 80.

Figure 2:
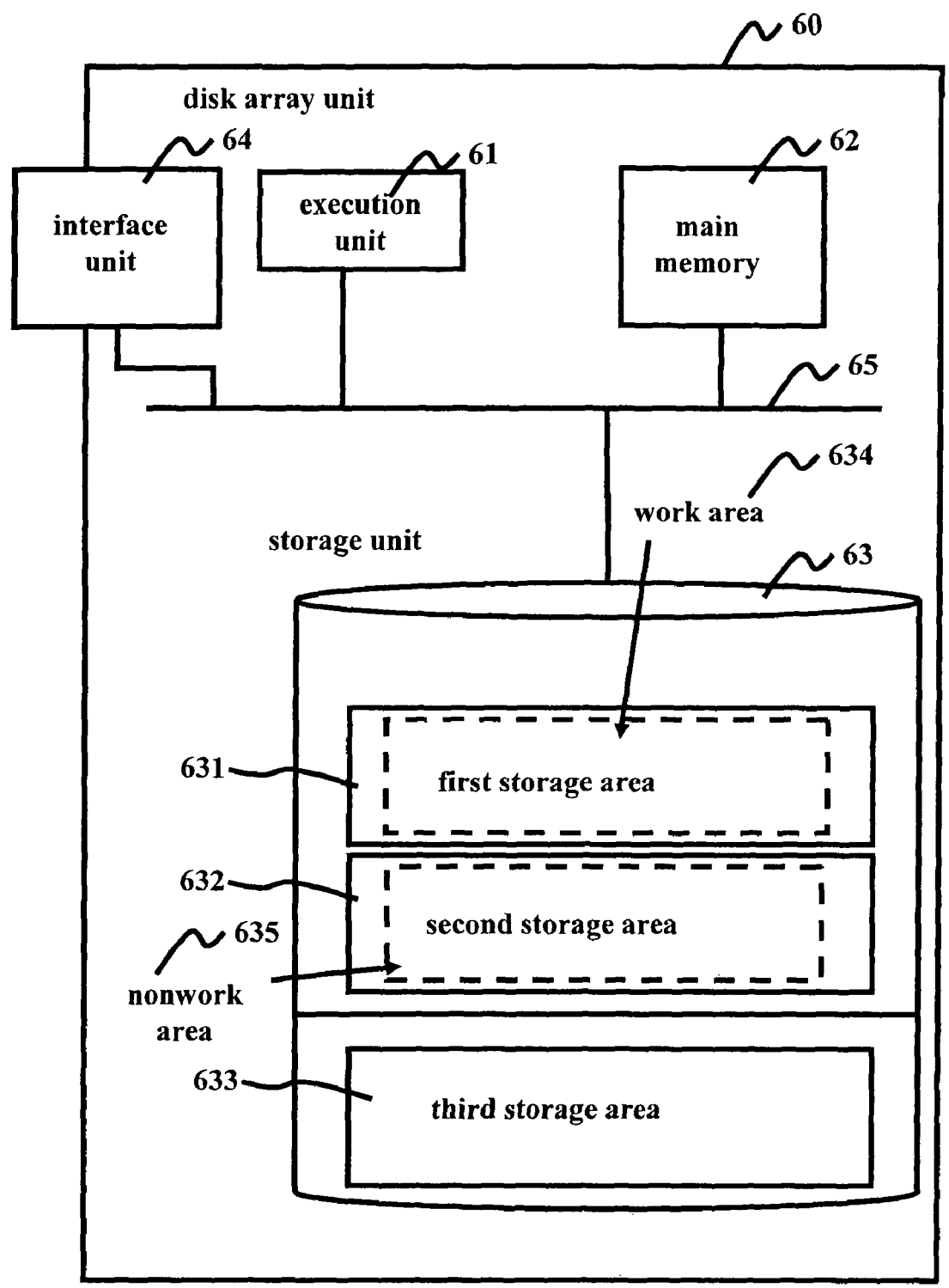
FIG. 2 is a diagram showing a configuration of a disk array unit.

Next, a disk array unit that is included in the disk array apparatus 1 and is to be replaced will be described. FIG. 2 is a diagram showing a configuration of the disk array unit. A disk array unit 60 has an execution unit 61, a main memory 62, storage unit 63, and an interface unit 64. The execution unit 61, the main memory 62, the storage unit 63, and the interface unit 64 are connected to each other via a bus 65.

The execution unit 61 reads firmware from the storage unit 63, expands the read firmware in the main memory 62, and then performs processing in accordance with the expanded firmware. The disk array unit 60 performs processing in accordance with the read firmware expanded in the main memory 62. Accordingly, if the version number of the firmware is changed, the disk array unit 60 will perform different processing. The storage capacities of main memories included in individual disk array units of the disk array apparatus 1 are different. A disk array unit containing a large main memory expands firmware, which has been saved in the storage unit in a compressed format, in the main memory. The disk array unit containing a large main memory, for example, the CM, operates by expanding all pieces of firmware in its main memory. After the disk array unit containing a large main memory has expanded all pieces of firmware in its main memory, firmware reading processing is not performed upon the storage unit. Accordingly, the firmware saved in the storage unit can be updated. The disk array unit containing a large main memory is expensive. On the other hand, a disk array unit containing a small main memory cannot expand all pieces of firmware, which have been saved in its storage unit, in its main memory due to the lack of the storage capacity of the main memory. The disk array unit containing a small main memory is, for example, the PBC for performing control processing and the SVC for monitoring and controlling the power supply of the disk array apparatus 1, and is inexpensive. Some of disk array units containing a small main memory have a file system in their storage unit. The disk array unit having the file system has a plurality of pieces of firmware in accordance with functions of the disk array unit and manages them. When the disk array unit operates in the disk array apparatus, the execution unit included in the disk array unit reads only firmware required for the current operation from the file system included in the storage unit, and expands the read firmware in the main memory. Accordingly, in the case of a disk array unit using a file system, a firmware reading operation is always performed upon a firmware storage area in the storage unit while the disk array unit is operating.

The main memory 62 is a memory in which firmware stored in the storage unit 63 is expanded, and is, for example, a RAM. The interface unit 64 is connected to the CM 2 and the CM 3. Upon receiving information from the CM 2 or the CM 3, the interface unit 64 transmits the received information to the execution unit 61. In addition, the interface unit 64 transmits the result of processing performed by the execution unit 61 in the disk array unit 60 to the CM 2 or the CM 3.

The storage unit 63 stores firmware, and has a plurality of storage areas. The storage unit 63 has a first storage area 631, a second storage area 632, and a third storage area 633. Firmware allowing the disk array unit 60 to function is stored in a storage area. More specifically, the storage unit 63 stores a piece of firmware in the first storage area 631, and stores another piece of firmware in the second storage area 632. For example, when it is determined that a malfunction has occurred in one of the two pieces of firmware, the disk array unit executes the other one of the pieces of firmware stored therein, thereby preventing the effect of the malfunction. Accordingly, the disk array unit 60 can select which of the pieces of firmware stored in the first storage area 631 and the second storage area 632 it should read and expand in the main memory 62. A storage area storing firmware which the execution unit 61 included in the disk array unit 60 will expand in the main memory 62 and executes is defined as a work area 634. On the other hand, a storage area storing firmware which the execution unit 61 will not expand in the main memory 62 is defined as a nonwork (nonexecution) area 635. A storage area functioning as the work area 634 is switched in accordance with a work area identification number stored in the third storage area 633. Accordingly, one of the first storage area 631 and the second storage area 632 functions as the work area 634 in accordance with the work area identification number. The storage unit 63 is, for example, a flash memory.

Figure 3A:
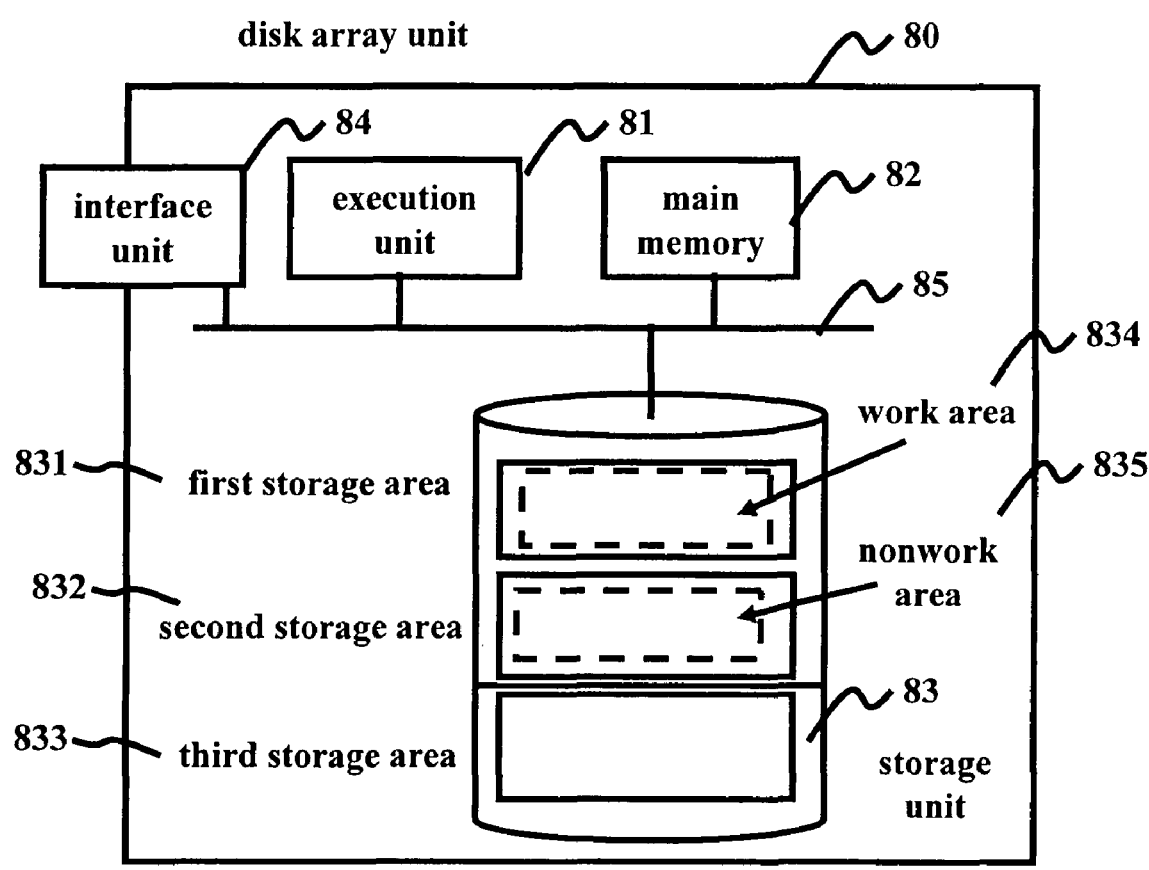
FIG. 3A is a diagram showing a configuration of a disk array unit that currently operates in the disk array apparatus.
Figure 3B:
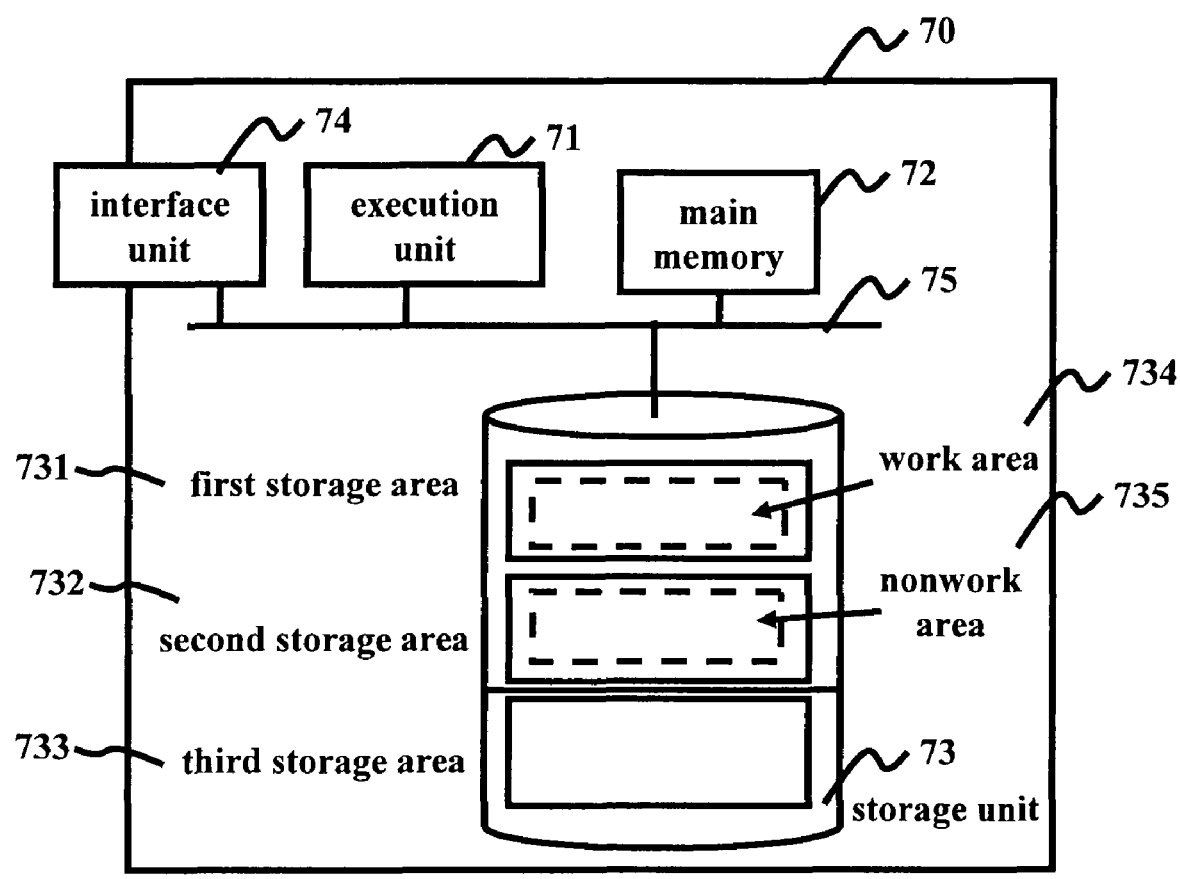
FIG. 3B is a diagram showing a configuration of a replacement disk array unit.

FIG. 3B is a diagram showing a configuration of the replacement disk array unit 70. FIG. 3A is a diagram showing a configuration of the disk array unit 80 that currently operates in the disk array apparatus 1. The replacement disk array unit 70 has an execution unit 71, a main memory 72, storage unit 73, and an interface unit 74. The execution unit 71, the main memory 72, the storage unit 73, and the interface unit 74 are connected to each other via a bus 75. The storage unit 73 has a first storage area 731, a second storage area 732, and a third storage area 733. A work area is defined as a work area 734, and a nonwork area is defined as a nonwork area 735. The disk array unit 80 that currently operates in the disk array apparatus 1 has an execution unit 81, a main memory 82, storage unit 83, and an interface unit 84. The execution unit 81, the main memory 82, the storage unit 83, and the interface unit 84 are connected to each other via a bus 85. The storage unit 83 has a first storage area 831, a second storage area 832, and a third storage area 833. A work area is defined as a work area 834, and a nonwork area is defined as a nonwork area 835.

Figure 4:
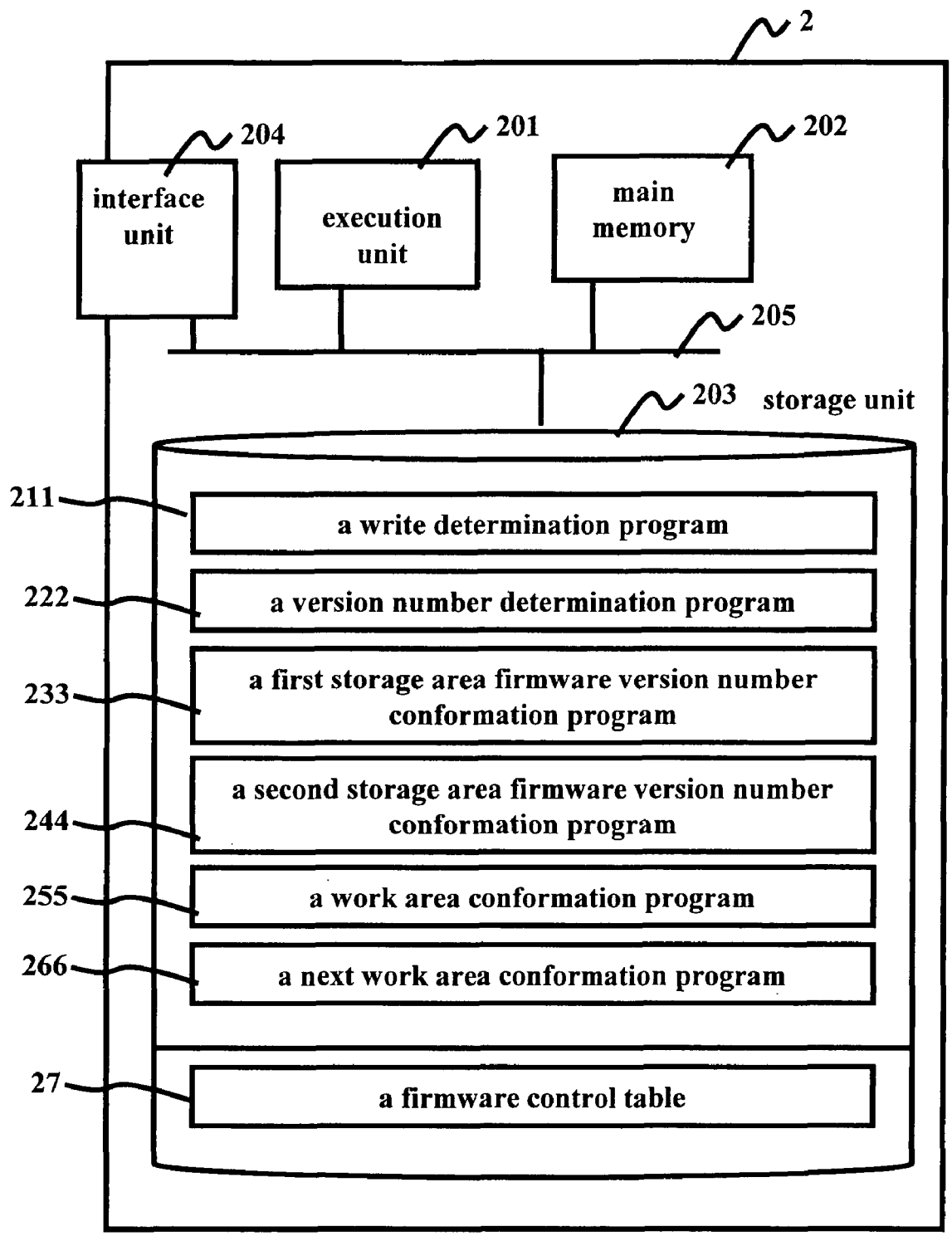
FIG. 4 is a diagram showing a configuration of a CM.

Next, the description of a Controller Module (CM) will be made. As shown in FIG. 1, the disk array apparatus 1 has a plurality of Controller Modules, the CM 2 and the CM 3. The configuration of the CM 2 will be described. The configuration of the CM 3 is the same, and therefore the description thereof will be omitted. FIG. 4 is a diagram showing a configuration of the CM 2. The CM 2 has an execution unit 201, a main memory 202, storage unit 203, and an interface unit 204. The execution unit 201, the main memory 202, the storage unit 203, and the interface unit 204 are connected to each other via a bus 205. The execution unit 201 functions as a write determination unit, a version number determination unit, a first storage area firmware version number conformation unit, a second storage area firmware version number conformation unit, a work area conformation unit, and a next work area conformation unit. The execution unit 201 expands a write determination program 211, a version number determination program 222, a first storage area firmware version number conformation program 233, a second storage area firmware version number conformation program 244, a work area conformation program 255, and a next work area conformation program 266, which are stored in the storage unit 203, in the main memory 202 so as to execute the programs.

The write determination unit determines whether firmware can be written in the work area 734 in the storage unit 73 included in the replacement disk array unit 70.

The version number determination unit detects a version number of firmware stored in the storage unit 83 included in the disk array unit 80 that is operating in the disk array apparatus 1, and a version number of firmware stored in the storage unit 73 included in the replacement disk array unit 70. In addition, the version number determination unit detects an identification number for the work area 834 in the storage unit 83 included in the disk array unit 80 that is operating in the disk array apparatus 1 and an identification number for the work area 734 in the storage unit 73 included in the replacement disk array unit 70. Furthermore, the version number determination unit detects an identification number for the next work area in the storage unit 83 included in the disk array unit 80 that is operating in the disk array apparatus 1 and an identification number for the next work area in the storage unit 73 included in the replacement disk array unit 70.

If the version number determination unit determines that the identification number for the work area 834 in the storage unit 83 included in the disk array unit 80 that is operating in the disk array apparatus 1 is different from the identification number for the work area 734 in the storage unit 73 included in the replacement disk array unit 70, the work area conformation unit makes the identification number for the work area 734 conform to the identification number for the work area 834.

The first storage area firmware version number conformation unit makes a version number of firmware stored in the first storage area 731 in the storage unit 73 included in the replacement disk array unit 70 conform to a version number of firmware stored in the first storage area 831 in the storage unit 83 included in the disk array unit 80 that is operating in the disk array apparatus 1.

The second storage area firmware version number conformation unit makes a version number of firmware stored in the second storage area 732 in the storage unit 73 included in the replacement disk array unit 70 conform to a version number of firmware stored in the second storage area 832 in the storage unit 83 included in the disk array unit 80 that is operating in the disk array apparatus 1.

The next work area conformation unit makes an identification number for the work area 734 in the storage unit 73 conforms to an identification number for the work area 834 in the storage unit 83. Firmware, which will be expanded in the main memory 82 after the disk array unit 80 is restarted, is stored in the work area 834. Firmware, which will be expanded in the main memory 72 after the disk array unit 70 is restarted, is stored in the work area 734.

The storage unit 203 in the CM 2 stores a firmware control table 27. The firmware control table 27 stores information which the CM 2 uses to manage firmware stored in storage unit in each disk array unit of the disk array apparatus 1. Next, the firmware control table 27 will be described.

Figure 5:
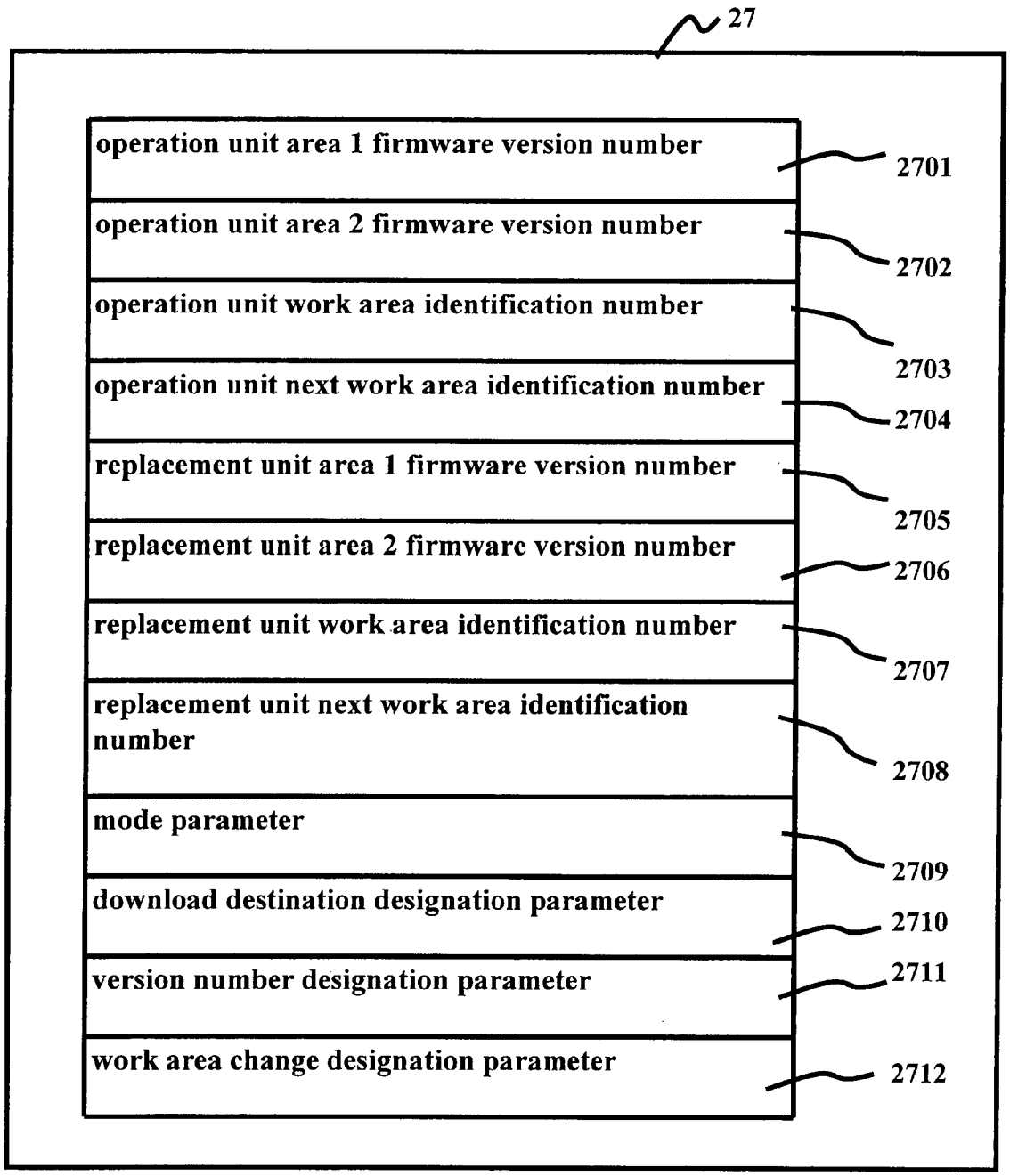
FIG. 5 is a diagram showing a configuration of a firmware control table.

FIG. 5 is a diagram showing a configuration of the firmware control table 27 possessed by a CM. Here, the firmware control table 27 is shown as storing only items pertaining to features of the present invention, and items pertaining to known firmware control are omitted. The firmware control table 27 stores the condition of the disk array unit 80 that currently operates in the disk array apparatus 1, the condition of the replacement disk array unit 70, and setting values used to perform processing upon the replacement disk array unit 70.

The firmware control table 27 stores an operation unit area 1 firmware version number 2701, an operation unit area 2 firmware version number 2702, an operation unit work area identification number 2703, an operation unit next work area identification number 2704, a replacement unit area 1 firmware version number 2705, a replacement unit area 2 firmware version number 2706, a replacement unit work area identification number 2707, and a replacement unit next work area identification number 2708.

The operation unit area 1 firmware version number 2701 is information about a version number of firmware stored in the first storage area 831 in the storage unit 83 included in the disk array unit 80 that currently operates in the disk array apparatus 1. The operation unit area 2 firmware version number 2702 is information about a version number of firmware stored in the second storage area 832 in the storage unit 83 included in the disk array unit 80 that currently operates in the disk array apparatus 1. The operation unit work area identification number 2703 is an identification number for a storage area corresponding to the work area 834 in the storage unit 83 included in the disk array unit 80 that currently operates in the disk array apparatus 1. The operation unit next work area identification number 2704 is an identification number for a storage area that will be set as a work area after the disk array unit 80 is rebooted.

The replacement unit area 1 firmware version number 2705 is information about a version number of firmware stored in the first storage area 731 in the storage unit 73 included in the replacement disk array unit 70. The replacement unit area 2 firmware version number 2706 is information about a version number of firmware stored in the second storage area 732 in the storage unit 73 included in the replacement disk array unit 70. The replacement unit work area identification number 2707 is an identification number for a storage area corresponding to the work area 734 in the storage unit 73 included in the replacement disk array unit 70. The replacement unit next work area identification number 2708 is an identification number for a storage area that will be set as a work area after the replacement disk array unit 70 is rebooted.

In this embodiment, version numbers of all pieces of firmware, which are individually stored in storage areas in storage unit included in disk array units that are operating in the disk array apparatus 1, are matched. In addition, work areas in individual storage unit are matched. Furthermore, work areas after the disk array units are individually rebooted are matched. The above-described matching operations are performed on the basis of the operation unit area 1 firmware version number 2701, the operation unit area 2 firmware version number 2702, the operation unit work area identification number 2703, and the operation unit next work area identification number 2704.

In order to achieve the above-described matching operations on the basis of the types of disk array units that are operating in the disk array apparatus 1, the operation unit area 1 firmware version number 2701, the operation unit area 2 firmware version number 2702, the operation unit work area identification number 2703, and the operation unit next work area identification number 2704 are prepared for each type of disk array unit.

Figure 7A:
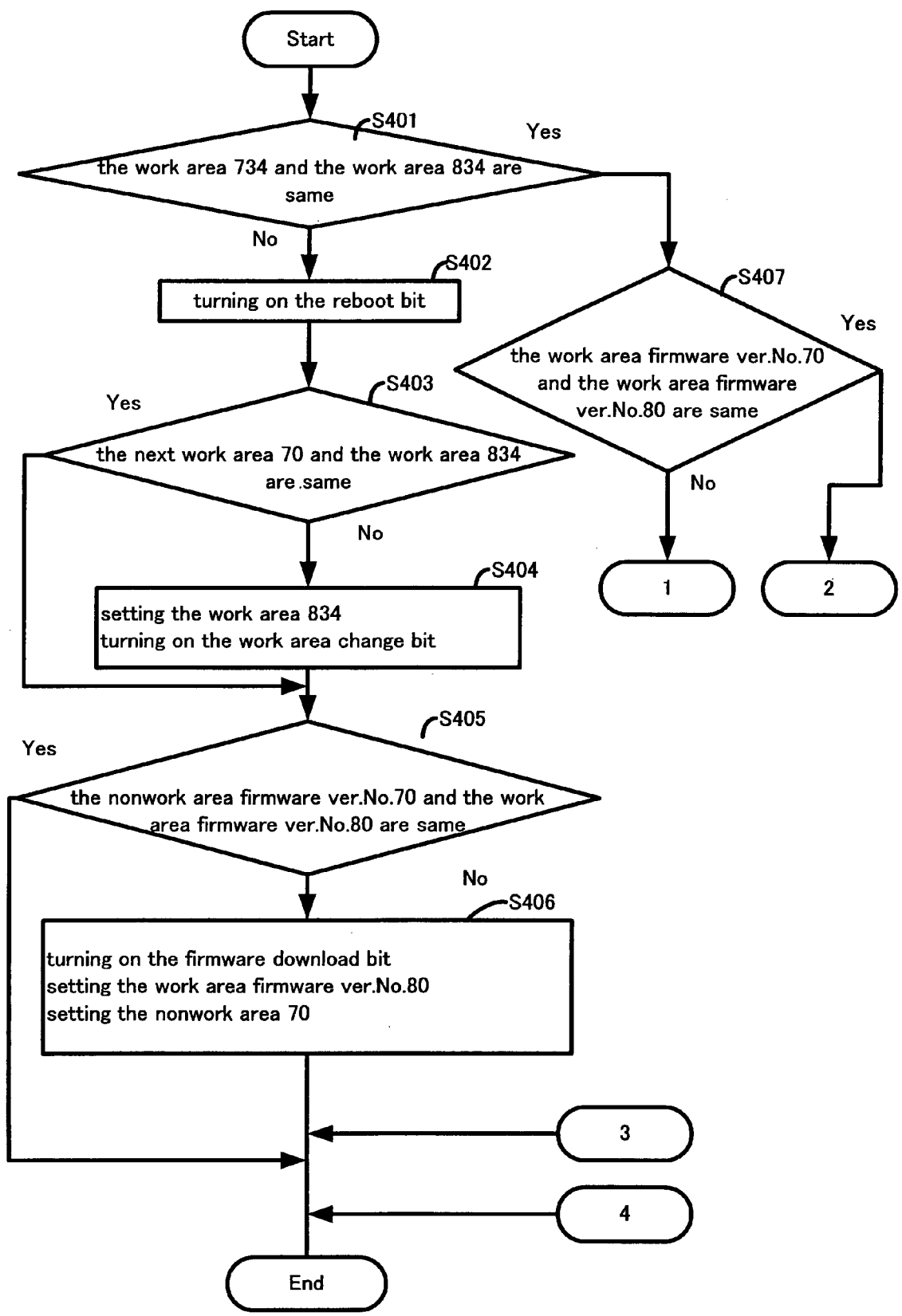
FIG. 7A is a flowchart showing a process of checking version numbers of a plurality of pieces of firmware in the case of a disk array unit having a work area into which firmware cannot be downloaded.
Figure 7B:
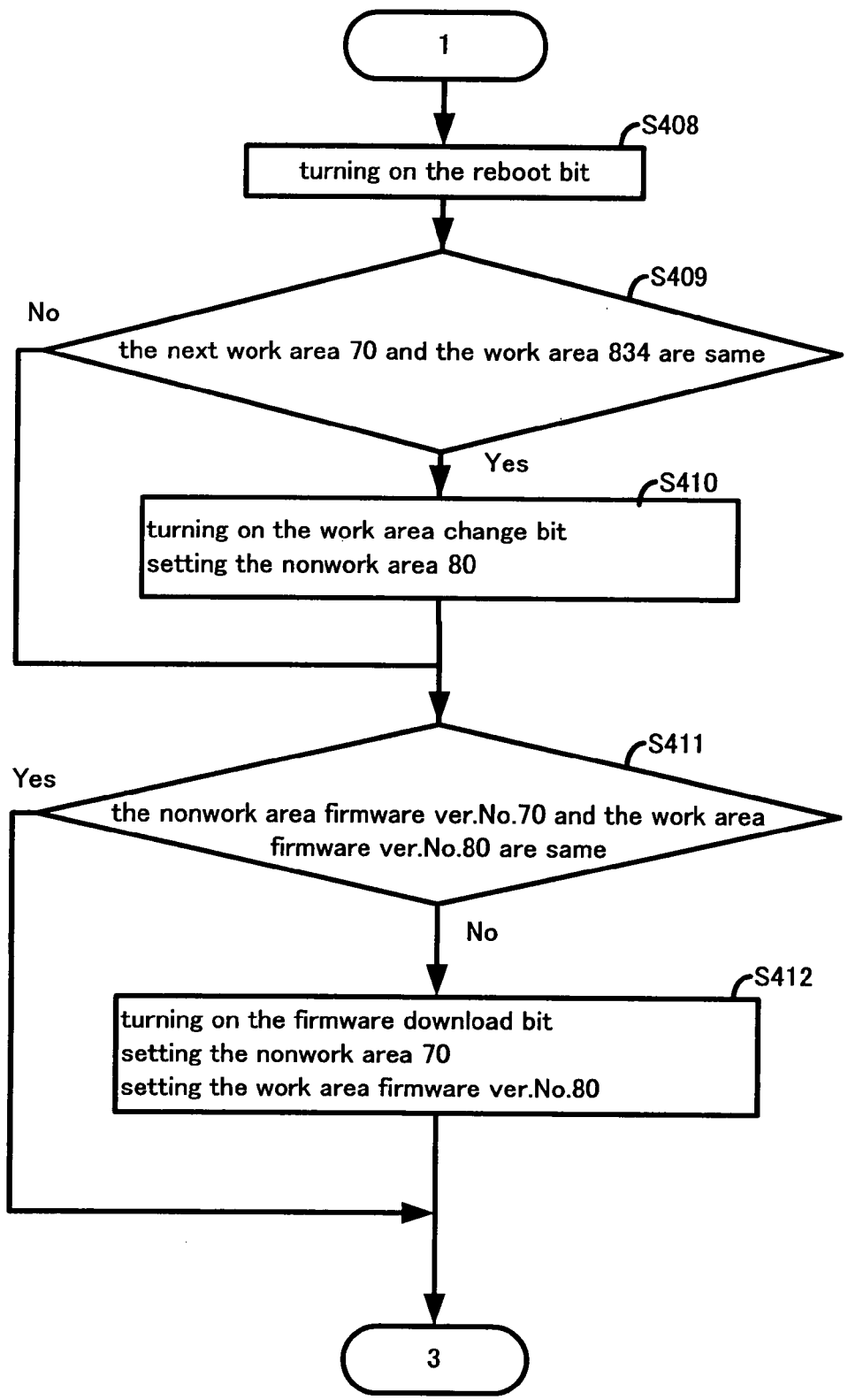
FIG. 7B is a flowchart showing a process of checking version numbers of a plurality of pieces of firmware in the case of a disk array unit having a work area into which firmware cannot be downloaded.
Figure 7C:
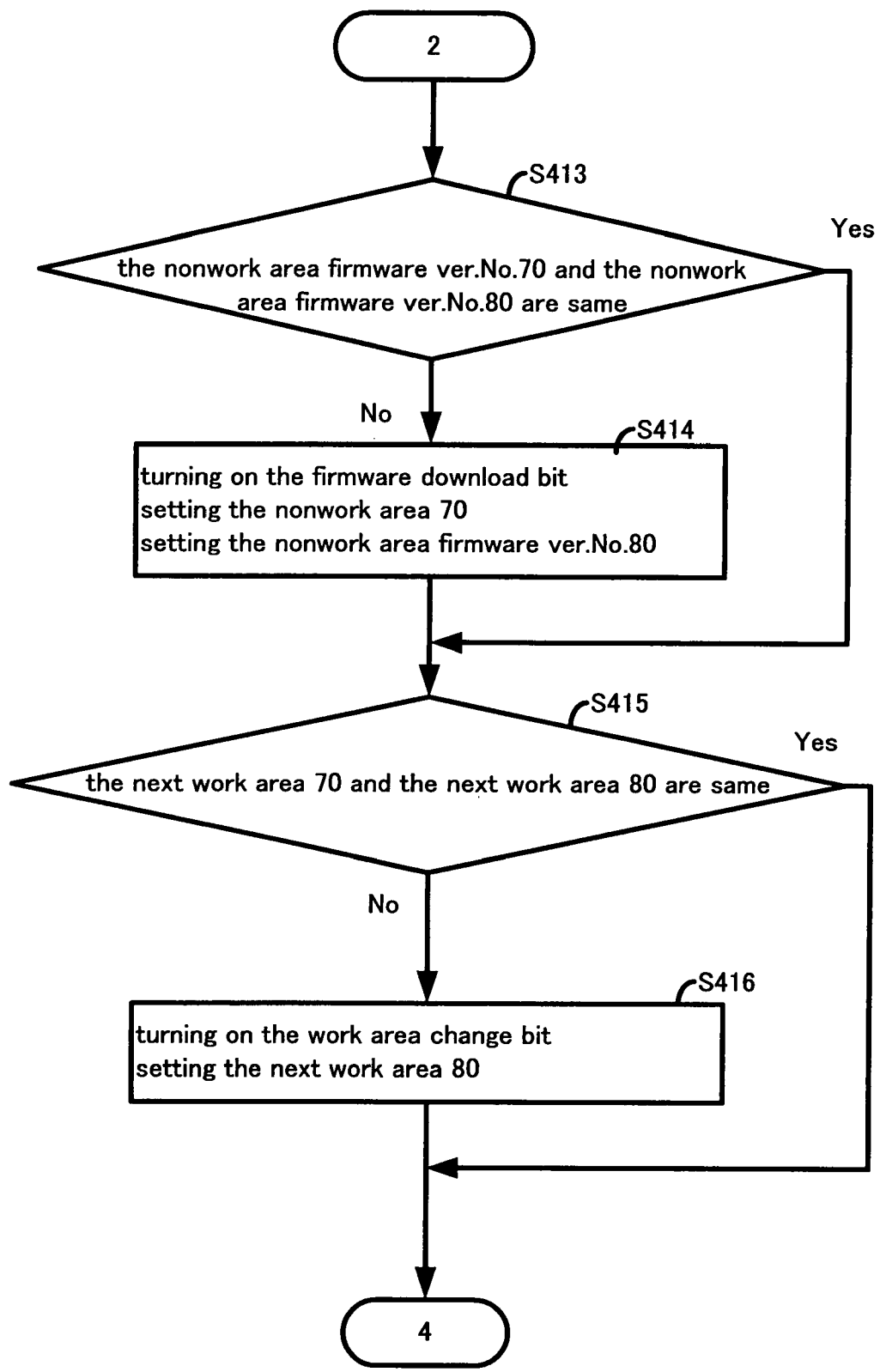
FIG. 7C is a flowchart showing a process of checking version numbers of a plurality of pieces of firmware in the case of a disk array unit having a work area into which firmware cannot be downloaded.
Figure 8A:
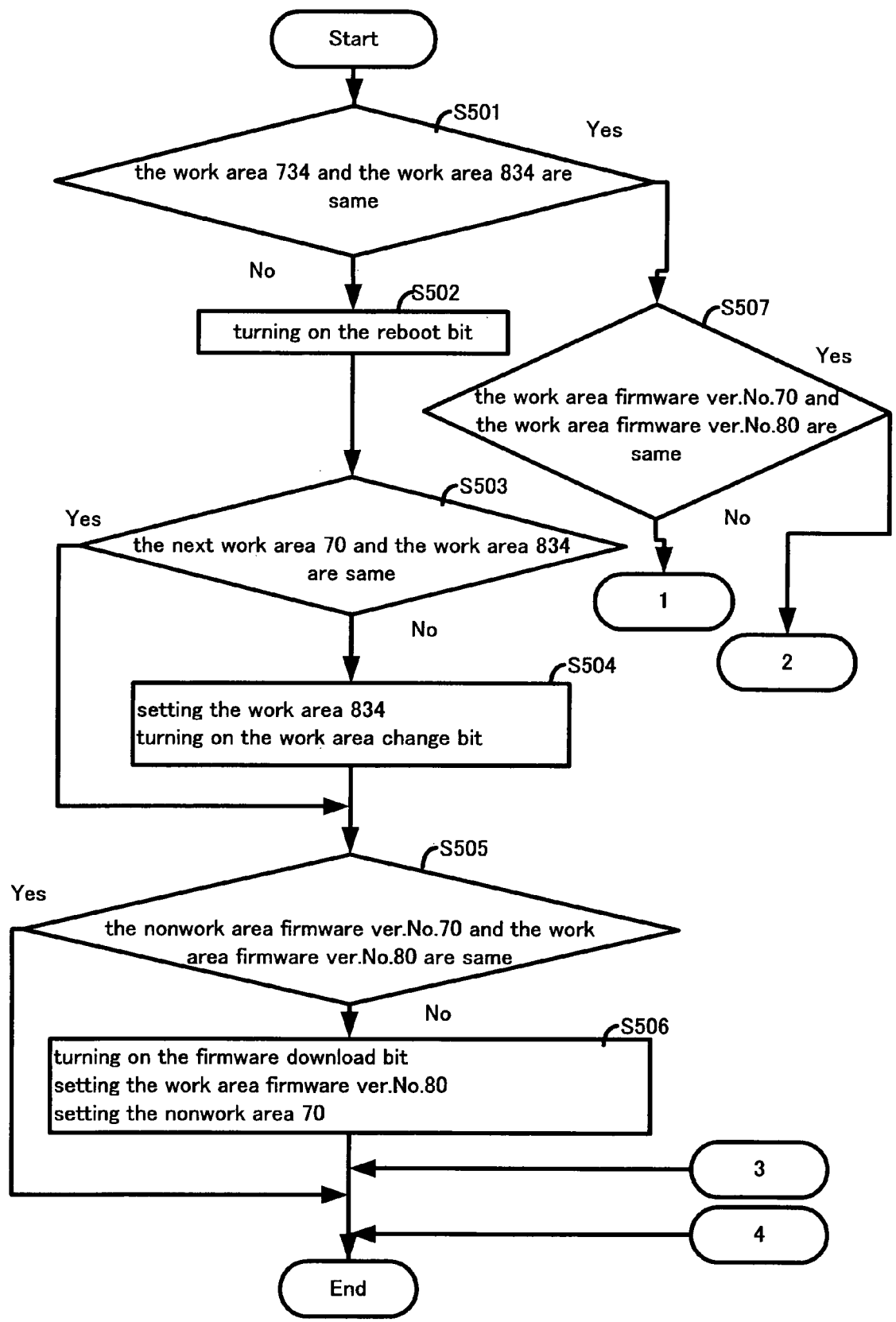
FIG. 8A is a flowchart showing a process of checking version numbers of a plurality of pieces of firmware in the case of a disk array unit having a work area into which firmware can be downloaded.
Figure 8B:
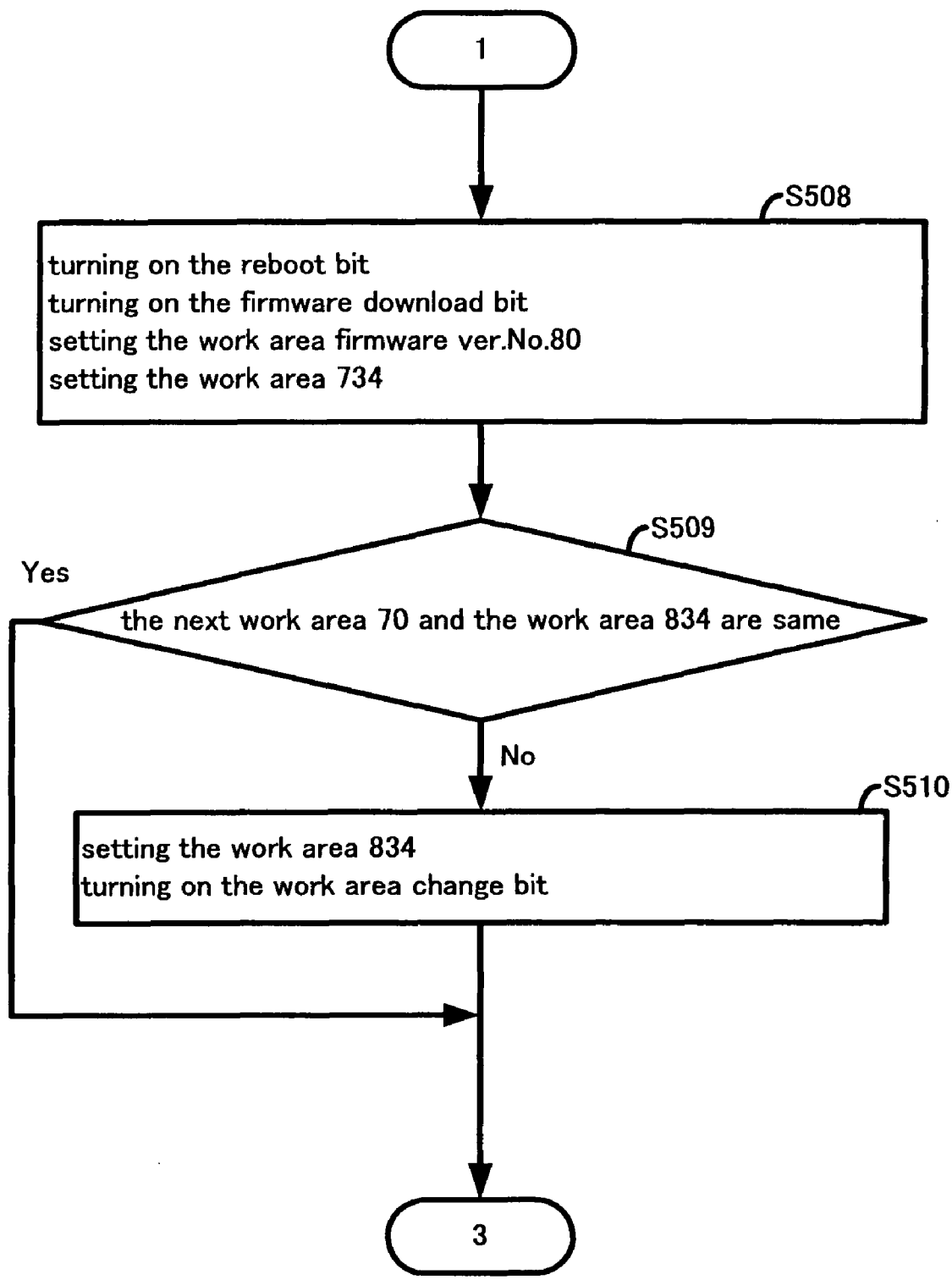
FIG. 8B is a flowchart showing a process of checking version numbers of a plurality of pieces of firmware in the case of a disk array unit having a work area into which firmware can be downloaded.
Figure 8C:
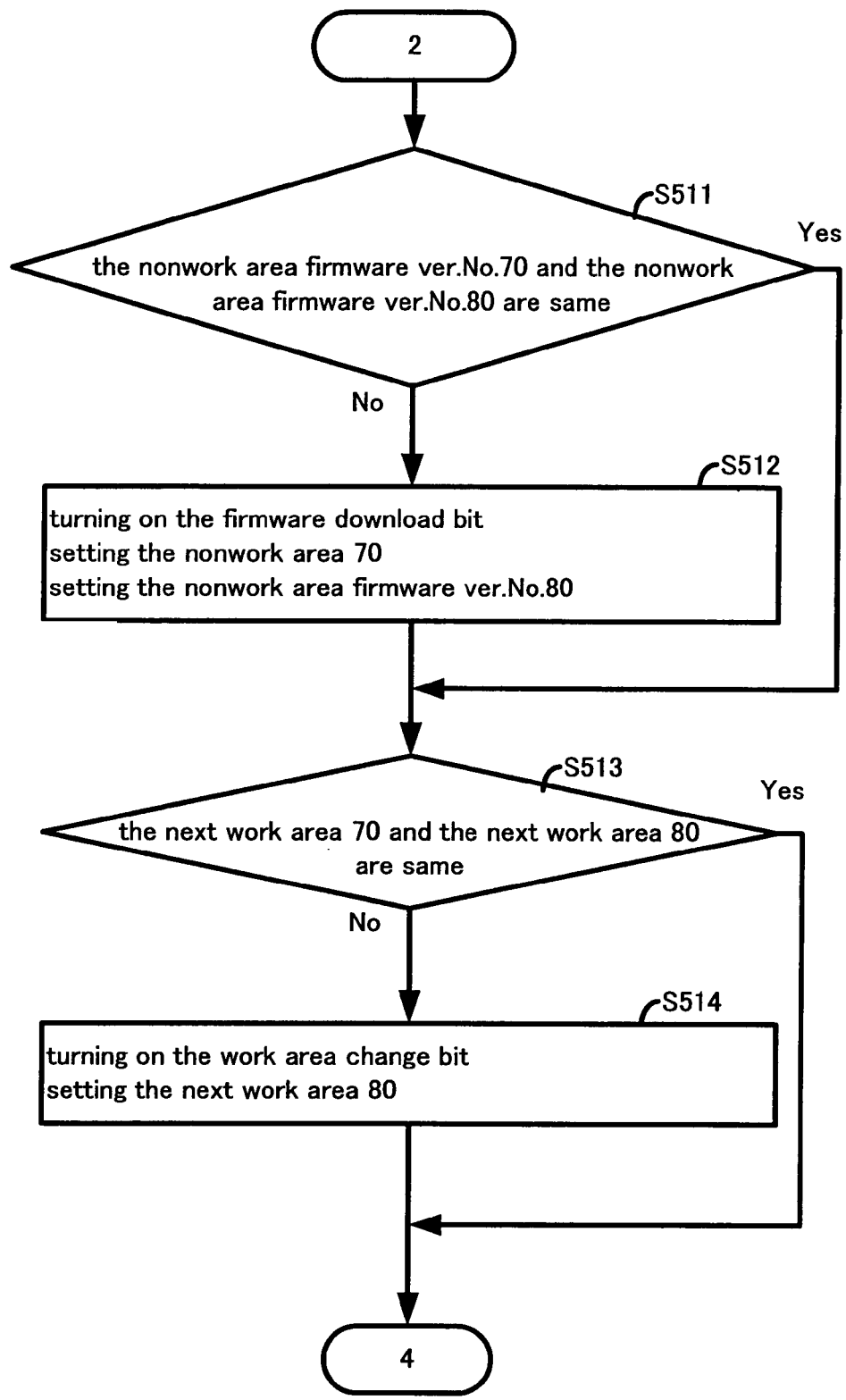
FIG. 8C is a flowchart showing a process of checking version numbers of a plurality of pieces of firmware in the case of a disk array unit having a work area into which firmware can be downloaded.

A mode parameter 2709 has a reboot bit, a work area change bit, and a firmware download bit. The reboot bit is a bit used to determine whether the replacement disk array unit 70 should be rebooted. The work area change bit is a bit used to determine whether the work area 734 in the storage unit 73 included in the disk array unit 70 should be changed. The firmware download bit is a bit used to determine whether firmware should be downloaded into the first storage area 731 or the second storage area 732 in the storage unit 73 included in the disk array unit 70. The mode parameter 2709 is set by the execution unit 201 included in the CM 2 in processes to be shown in flowcharts of FIG. 7A, FIG. 7B, FIGS. 7C and 8. FIG. 7A, FIG. 7B, and FIG. 7C are a flowchart showing a process of checking version numbers of a plurality of pieces of firmware in the case of a disk array unit having a work area into which firmware cannot be written. FIG. 8A, FIG. 8B and FIG. 8C is a flowchart showing a process of checking version numbers of a plurality of pieces of firmware in the case of a disk array unit having a work area into which firmware can be written. The execution unit 201 included in the CM 2 uses the mode parameter 2709 to determine whether version numbers of a plurality of pieces of firmware stored in disk array units are matched in a process to be shown in a flowchart of FIG. 6.

A download destination designation parameter 2710 stores an identification number for a storage area in the storage unit 73 included in the replacement disk array unit 70 into which firmware will be downloaded. A version number designation parameter 2711 stores a version number of firmware to be downloaded into the storage area in the storage unit 73 included in the replacement disk array unit 70. A work area change designation parameter 2712 stores an identification number for a storage area that will be set as the work area 734 after the replacement disk array unit 70 is rebooted.

Figure 6:
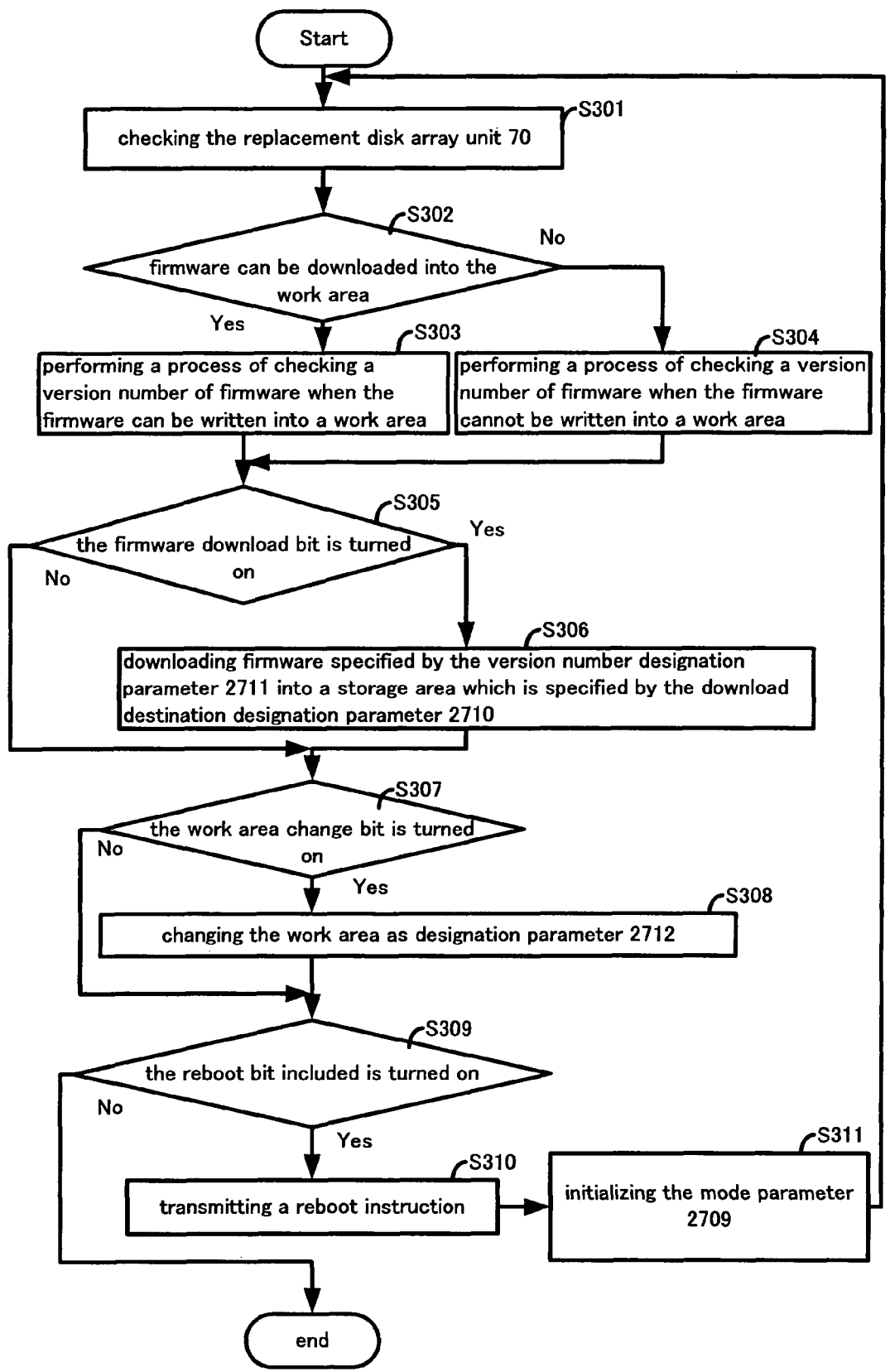
FIG. 6 is a flowchart showing a process of making version numbers of a plurality of pieces of firmware stored in disk array units conform to each other.

FIG. 6 is a flowchart showing a process performed when a disk array unit is newly disposed in the disk array apparatus 1 according to an embodiment of the present invention. While a new disk array unit is being disposed into the disk array apparatus 1, the disk array apparatus 1 also continues to operate. The CM 2 in the disk array apparatus 1 performs the following three matching operations when disposing the new disk array unit into the disk array apparatus 1 so as to make the conditions of the new disk array unit conform to those of the disk array unit that currently operates in the disk array apparatus 1. A first matching operation is performed by making version numbers of a plurality of pieces of firmware stored in the first storage area 731 and the second storage area 732 in the storage unit 73 included in the replacement disk array unit 70 conform to those of a plurality of pieces of firmware stored in the first storage area 831 and the second storage area 832 in the storage unit 83 included in the disk array unit 80 that currently operates in the disk array apparatus 1. A second matching operation is performed by making the work area 734 in the storage unit 73 included in the replacement disk array unit 70 conform to the work area 834 in the storage unit 83 included in the disk array unit 80 that currently operates in the disk array apparatus 1. A third matching operation is performed by making the work area 734 in the storage unit 73 which will be made to start to function after the replacement disk array unit 70 is restarted conform to the work area 834 in the storage unit 83 which will be made to start to function after the disk array unit 80 is restarted.

The execution unit 201 in the CM 2 expands the write determination program 211, the version number determination program 222, the first storage area firmware version number conformation program 233, the second storage area firmware version number conformation program 244, the work area conformation program 255, and the next work area conformation program 266, which are stored in the storage unit 203 included in the CM 2, in the main memory 202 included in the CM 2 so as to execute these programs. The CM 2 functions as the write determination unit, the version number determination unit, the first storage area firmware version number conformation unit, the second storage area firmware version number conformation unit, the work area conformation unit, and the next work area conformation unit so as to make the conditions of the replacement disk array unit 70 conform to those of the disk array unit 80 that currently operates in the disk array apparatus 1 when the disk array apparatus 1 recognizes the replacement disk array unit 70.

First, the execution unit 201 in the CM 2 checks the replacement disk array unit 70 (S301). More specifically, the execution unit 201 acquires from the third storage area in the storage unit 73 included in the replacement disk array unit 70 information about the type of the disk array unit 70, an identification number for a storage area corresponding to the work area 734 in the storage unit 73 included in the disk array unit 70, an identification number for a storage area in the storage unit 73 which will function as a work area after the disk array unit 70 is rebooted, a version number of firmware stored in the first storage area 731 in the storage unit 73 included in the disk array unit 70, a version number of firmware stored in the second storage area 732 in the storage unit 73 included in the disk array unit 70, a serial number of the disk array unit 70, OS information of the disk array unit 70, and file system information of the disk array unit 70. The execution unit 201 in the CM 2 registers the acquired information in the firmware control table 27 included in the CM 2.

Next, the execution unit 201 in the CM 2 determines whether firmware can be downloaded into the work area 734 in the storage unit 73 included in the replacement disk array unit 70 on the basis of the OS information and the file system information, which have been acquired from the replacement disk array unit 70 (S302). For example, the determination in S302 can be achieved by storing in the storage unit 203 in advance information created by associating information about whether the CM 2 can directly download firmware into a work area with OS information and information created by associating information about whether the CM 2 can directly download firmware into a work area with file system information.

If the execution unit 201 can determine whether firmware can be downloaded into the work area 734 in the storage unit 73 included in the disk array unit 70 on the basis of only the type of the replacement disk array unit 70, the determination in S302 may be achieved on the basis of information created by associating information about whether the CM 2 can directly download firmware into a work area with information about the type of the disk array unit 70. If the execution unit 201 can determine whether firmware can be downloaded into the work area 734 in the storage unit 73 included in the disk array unit 70 on the basis of the combination of a plurality of pieces of information about the type, version number, and serial number of the replacement disk array unit 70, the determination in S302 may be achieved on the basis of information created by combining a plurality of pieces of information about the type, version number, and serial number of the replacement disk array unit 70.

The write determination unit determines whether firmware can be written into the work area included in the replacement disk array unit 70 on the basis of the OS information and file system information of the replacement disk array unit 70. Accordingly, even if the specification of a disk array unit having a work area in its storage unit, in which firmware can be written when the disk array unit meets OS information and file system information registered in advance, is changed in its development process, so that no data can be written into the work area, this has no effect on a firmware download control program.

If firmware can be downloaded into the work area 734 in the storage unit 73 included in the replacement disk array unit 70, the execution unit 201 in the CM 2 performs a process of checking a version number of firmware when the firmware can be written into a work area in a disk array unit (S303). The details of the process in S303 will be shown in FIG. 8A, FIG. 8B and FIG. 8C. On the other hand, if firmware cannot be downloaded into the work area 734 in the storage unit 73 included in the replacement disk array unit 70, the execution unit 201 in the CM 2 performs a process of checking a version number of firmware when the firmware cannot be written into a work area in a disk array unit (S304). The details of the process in S304 will be shown in FIG. 7A, FIG. 7B, and FIG. 7C.

After the version number of firmware stored in the replacement disk array unit 70 has been checked in S303 or S304, the execution unit 201 in the CM 2 refers to the firmware control table 27 included in the CM 2 so as to determine whether the firmware download bit included in the mode parameter 2709 is turned on (S305).

If the firmware download bit is turned on (Yes in S305), the execution unit 201 in the CM 2 downloads firmware specified by the version number designation parameter 2711 into a storage area in the storage unit 73 included in the replacement disk array unit 70 which is specified by the download destination designation parameter 2710 (S306).

Subsequently, the execution unit 201 in the CM 2 determines whether the work area change bit included in the mode parameter 2709 is turned on (S307). If the work area change bit is turned on (Yes in S307), the execution unit 201 sets a storage area in the storage unit 73 included in the replacement disk array unit 70 which corresponds to an identification number indicated by the work area change designation parameter 2712 as the work area 734 (S308). More specifically, the execution unit 201 transmits setting information to the replacement disk array unit 70. The execution unit 71 in the disk array unit 70 stores the received setting information in the third storage area 733.

Subsequently, the execution unit 201 in the CM 2 determines whether the reboot bit included in the mode parameter 2709 is turned on (S309). If the reboot bit is turned on (Yes in S309), the execution unit 201 transmits a reboot instruction to the replacement disk array unit 70 (S310). The execution unit 201 initializes the mode parameter 2709 (S311). If the reboot bit is turned off (No in S309), the execution unit 201 ends the process. Accordingly, if the reboot bit included in the mode parameter 2709 is turned on, the execution unit 201 in the CM 2 re-performs the process from S301 to S309 after the replacement disk array unit 70 is rebooted, and continues the process until the reboot bit included in the mode parameter 2709 is turned off.

If firmware can be downloaded into the work area 734 in the storage unit 73 included in the replacement disk array unit 70, matching of firmware version numbers and work areas between the disk array unit 80 that currently operates in the disk array apparatus 1 and the replacement disk array unit 70 can be achieved by causing the disk array unit 70 to be rebooted on a one-time basis only. If firmware cannot be downloaded into the work area 734 in the storage unit 73 included in the replacement disk array unit 70, matching of firmware version numbers and work areas between the disk array unit 80 that currently operates in the disk array apparatus 1 and the replacement disk array unit 70 can be achieved by causing the disk array unit 70 to be rebooted up to two times.

Accordingly, when the reboot bit included in the mode parameter 2709 is in a "ON" state despite the fact that the disk array unit 70 has been rebooted more than the maximum number of times, the disk array unit 70 may not make a version number of firmware stored in the storage area in the storage unit thereof and a work area in the storage unit thereof conform to those of the disk array unit 80. In this case, the replacement disk array unit 70 may be detected as an abnormal disk array unit.

FIG. 7A, FIG. 7B, and FIG. 7C are a flowchart showing a process of checking version numbers of a plurality of pieces of firmware when firmware cannot be downloaded into the work area 734 in the storage unit 73 included in the replacement disk array unit 70. A numeral 70 represents a disk array unit to be disposed in a disk array apparatus. A numeral 80 represents a disk array unit that currently operates in the disk array apparatus. The work area 734 represents a work area in the disk array unit to be disposed in the disk array apparatus in which firmware is stored. The work area 834 represents a work area in the disk array unit that currently operates in the disk array apparatus in which firmware is stored.

A work area firmware version number 70 represents a version number of firmware stored in the work area 734. A work area firmware version number 80 represents a version number of firmware stored in the work area 834. A nonwork area firmware version number 70 represents a version number of firmware stored in a nonwork area in a storage area included in the disk array unit to be disposed in the disk array apparatus. A nonwork area firmware version number 80 represents a version number of firmware stored in a nonwork area in a storage area included in the disk array unit that currently operates in the disk array apparatus. A next work area 70 represents an area in which firmware, to be executed after the disk array unit 70 is restarted, is stored. A next work area 80 represents an area in which firmware, to be executed after the disk array unit 80 is restarted, is stored.

The execution unit 201 in the CM 2 compares the operation unit work area identification number 2703 with the replacement unit work area identification number 2707, the numbers being registered in the firmware control table 27 (S401). If the numbers are the same (Yes in S401), the execution unit 201 performs processing of S407.

If the numbers are not the same in S401 (No in S401), the execution unit 201 in the CM 2 turns on the reboot bit included in the mode parameter 2709 registered in the firmware control table 27 (S402), because an identification number for the work area 734 included in the replacement unit 70 differs from an identification number for the work area 834 included in the disk array unit 80 that is operating in the disk array apparatus 1 and the disk array unit 70 is required to be rebooted.

Subsequently, the execution unit 201 in the CM 2 determines whether the operation unit work area identification number 2703 and the replacement unit next work area identification number 2708 are the same (S403). If it is determined that the identification numbers are not the same (No in S403), the execution unit 201 in the CM 2 sets an identification number corresponding to the work area 834 included in the disk array unit 80, which is operating in the disk array apparatus 1, for the work area change designation parameter 2712 included in the firmware control table 27 (S404), because an identification number for the work area 734 included in the replacement disk array unit 70 differs from an identification number for the work area 834 included in the disk array unit 80. In addition, the execution unit 201 in the CM 2 turns on the work area change bit included in the mode parameter 2709 (S404) so as to change a storage area corresponding to the work area 734 included in the replacement disk array unit 70.

Subsequently, the execution unit 201 in the CM 2 determines whether a version number of firmware stored in the nonwork area 735 in the storage unit 73 included in the replacement disk array unit 70 and a version number of firmware stored in the work area 834 included in the disk array unit 80 that is operating in the disk array apparatus 1 are the same (S405).

More specifically, if the replacement unit work area identification number 2707 is one, the version number of firmware stored in the nonwork area 735 included in the replacement disk array unit 70 is a version number of firmware stored in the second storage area 732 in the storage unit 73 included in the replacement disk array unit 70.

If the replacement unit work area identification number 2707 is two, the version number of firmware stored in the nonwork area 735 included in the replacement disk array unit 70 is a version number of firmware stored in the first storage area 731 in the storage unit 73 included in the replacement disk array unit 70. If the operation unit work area identification number 2703 is one, the version number of firmware stored in the nonwork area 835 included in the disk array unit 80 that is operating in the disk array apparatus 1 is a version number of firmware stored in the second storage area 832 in the storage unit 83 included in the disk array unit 80. If the operation unit work area identification number 2703 is two, the version number of firmware stored in the nonwork area 835 included in the disk array unit 80 that is operating in the disk array apparatus 1 is a version number of firmware stored in the first storage area 831 in the storage unit 83 included in the disk array unit 80.

If the firmware version numbers compared with each other in S405 are not the same (No in S405), the execution unit 201 in the CM 2 sets an identification number corresponding to the nonwork area 735 included in the replacement disk array unit 70 for the download destination designation parameter 2710 registered in the firmware control table 27. In addition, the execution unit 201 sets a version number of firmware stored in the work area 834 for the version number designation parameter 2711. Furthermore, the execution unit 201 turns on the firmware download bit included in the mode parameter 2709 so as to download firmware stored in the work area 834 included in the disk array unit 80, which currently operates in the disk array apparatus 1, into the nonwork area 735 included in the replacement disk array unit 70 (S406).

Next, the process performed when the identification number for the work area 734 included in the replacement disk array unit 70 and the identification number for the work area 834 included in the disk array unit 80 that currently operates in the disk array apparatus 1 are the same will be described.

If the operation unit work area identification number 2703 and the replacement unit work area identification number 2707 are the same in the firmware control table 27 (Yes in S401), the execution unit 201 in the CM 2 compares a version number of firmware stored in the work area 734 included in the replacement disk array unit 70 with a version number of firmware stored in the work area 834 included in the disk array unit 80 that currently operates in the disk array apparatus 1 (S407). If the version numbers are the same (Yes in S407), the conditions of the replacement disk array unit 70 can be made to conform to the conditions of the disk array unit 80 that currently operates in the disk array apparatus 1 without rebooting the disk array unit 70. The conditions include version numbers of individual pieces of firmware stored in the first storage area 731 and the second storage area 732 in the storage unit 73 included in the disk array unit 70, the work area 734 in the storage unit 73 included in the disk array unit 70, and an identification number for a storage area in which data will be expanded after the disk array unit 70 is rebooted.

If the version numbers compared with each other in S407 are not the same (No in S407), the execution unit 201 in the CM 2 turns on the reboot bit included in the mode parameter 2709 in the firmware control table 27 (S408) so as to cause the disk array unit 70 to be rebooted. That is, it is required to reboot the disk array unit 70 so as to set a storage area that functioned as the work area 734 before the reboot operation as the nonwork area 735 after the reboot operation, and write into the nonwork area 735 firmware stored in the work area 834 included in the disk array unit 80.

Subsequently, the execution unit 201 in the CM 2 determines whether an identification number for a storage area to be set as the work area 734 after the disk array unit 70 is rebooted and an identification number for the work area 834 in the storage unit 83 included in the disk array unit 80 that is operating in the disk array apparatus 1 are the same. The execution unit 201 determines whether the replacement unit next work area identification number 2708 and the operation unit work area identification number 2703 are the same in the firmware control table 27 (S409).

If the identification numbers are the same (Yes in S409), the execution unit 201 in the CM 2 sets an identification number corresponding to the nonwork area 835 in the storage unit 83 included in the disk array unit 80 for the work area change designation parameter 2712 in the firmware control table 27. In addition, the execution unit 201 turns on the work area change bit included in the mode parameter 2709 (S410).

Subsequently, the execution unit 201 in the CM 2 determines whether a version number of firmware stored in the nonwork area 735 included in the replacement disk array unit 70 and a version number of firmware stored in the work area 834 included in the disk array unit 80 that is operating in the disk array apparatus 1 are the same (S411). The execution unit 201 specifies the version number of firmware stored in the nonwork area 735 included in the replacement disk array unit 70 on the basis of the replacement unit area 1 firmware version number 2705 or the replacement unit area 2 firmware version number 2706 corresponding to an identification number that is not the replacement unit work area identification number 2707. In addition, the execution unit 201 specifies the version number of firmware stored in the work area 834 included in the disk array unit 80 that is operating in the disk array apparatus 1 on the basis of the operation unit area 1 firmware version number 2701 or the operation unit area 2 firmware version number 2702 corresponding to the operation unit work area identification number 2703.

If the version numbers compared with each other in S411 are not the same (No in S411), the execution unit 201 in the CM 2 sets an identification number corresponding to the nonwork area 735 included in the replacement disk array unit 70 for the download destination designation parameter 2710 in the firmware control table 27. In addition, the execution unit 201 sets a version number of firmware stored in the work area 834 included in the disk array unit 80 for the version number designation parameter 2711. Furthermore, the execution unit 201 turns on the firmware download bit included in the mode parameter 2709 (S412).

Next, the process performed when the version numbers compared with each other in S407 are the same will be described. If the version numbers are the same (Yes in S407), the execution unit 201 in the CM 2 determines whether a version number of firmware stored in the nonwork area 735 included in the replacement disk array unit 70 and a version number of firmware stored in the nonwork area 835 included in the disk array unit 80 that is operating in the disk array apparatus 1 are the same (S413). If the version numbers are the same (Yes in S413), the execution unit 201 in the CM 2 performs processing of S415. If the version numbers are not the same (No in S413), the execution unit 201 in the CM 2 sets an identification number corresponding to the nonwork area 735 included in the replacement disk array unit 70 for the download destination designation parameter 2710 included in the firmware control table 27. The identification number corresponding to the nonwork area 735 is different from the replacement unit work area identification number 2707 included in the firmware control table 27. In addition, the execution unit 201 sets a version number of firmware stored in the nonwork area 835 included in the disk array unit 80 for the version number designation parameter 2711 included in the firmware control table 27. Furthermore, the execution unit 201 turns on the firmware download bit included in the mode parameter 2709 (S414).

Subsequently, the execution unit 201 determines whether an identification number for a storage area to be set as the work area 734 after the replacement disk array unit 70 is rebooted and an identification number for a storage area to be set as the work area 834 after the disk array unit 80 is rebooted are the same (S415). More specifically, the execution unit 201 determines whether the operation unit next work area identification number 2704 and the replacement unit next work area identification number 2708 are the same. If the identification numbers are the same (Yes in S415), the execution unit 201 ends the process. If the identification numbers are not the same (No in S415), the execution unit 201 sets the operation unit next work area identification number 2704 for the work area change designation parameter 2712 included in the firmware control table 27. In addition, the execution unit 201 turns on the work area change bit included in the mode parameter 2709 (S416).

FIG. 8A, FIG. 8B and FIG. 8C are a flowchart showing a process of checking version numbers of a plurality of pieces of firmware in the case of a disk array unit having a work area into which firmware can be downloaded. A numeral 70 represents a disk array unit to be disposed in a disk array apparatus. A numeral 80 represents a disk array unit that currently operates in the disk array apparatus. The work area 734 represents a work area in the disk array unit to be disposed in the disk array apparatus in which firmware is stored. The work area 834 represents a work area in the disk array unit that currently operates in the disk array apparatus in which firmware is stored. A work area firmware version number 70 represents a version number of firmware stored in the work area 734. A work area firmware version number 80 represents a version number of firmware stored in the work area 834. A nonwork area firmware version number 70 represents a version number of firmware stored in a nonwork area in a storage area included in the disk array unit to be disposed in the disk array apparatus. A nonwork area firmware version number 80 represents a version number of firmware stored in a nonwork area in a storage area included in the disk array unit that currently operates in the disk array apparatus. A next work area 70 represents an area in which firmware, to be executed after the disk array unit 70 is restarted, is stored. A next work area 80 represents an area in which firmware, to be executed after the disk array unit 80 is restarted, is stored.

The execution unit 201 in the CM 2 compares an identification number for the work area 734 included in the replacement disk array unit 70 with an identification number for the work area 834 included in the disk array unit 80 that currently operates in the disk array apparatus 1 (S501). If the identification numbers are the same (Yes in S501), the execution unit 201 performs processing of S507.

On the other hand, if the identification numbers are not the same (No in S501), the execution unit 201 performs the process from S502. First, the execution unit 201 turns on the reboot bit included in the mode parameter 2709 in the firmware control table 27 (S502). Subsequently, the execution unit 201 determines whether the replacement unit next work area identification number 2708 and the operation unit work area identification number 2703 are the same (S503). If the identification numbers are the same (Yes in S503), the execution unit 201 performs processing of S505. On the other hand, if the identification numbers are not the same (No in S503), the execution unit 201 sets the operation unit work area identification number 2703 for the work area change designation parameter 2712 included in the firmware control table 27. In addition, the execution unit 201 turns on the work area change bit included in the mode parameter 2709 (S504).

Subsequently, the execution unit 201 determines whether a version number of firmware stored in the nonwork area 735 included in the replacement disk array unit 70 and a version number of firmware stored in the work area 834 included in the disk array unit 80 that is operating in the disk array apparatus 1 are the same (S505). In addition, the execution unit 201 acquires the version number of firmware in the nonwork area 735 corresponding to an identification number that is not the replacement unit work area identification number 2707 on the basis of the replacement unit area 1 firmware version number 2705 or the replacement unit area 2 firmware version number 2706. Furthermore, the execution unit 201 acquires the version number of firmware in the work area 834 corresponding to the operation unit work area identification number 2703 on the basis of the operation unit area 1 firmware version number 2701 or the operation unit area 2 firmware version number 2702.

If the version numbers compared with each other in S505 are the same (Yes in S505), the execution unit 201 ends the process. On the other hand, If the version numbers are not the same (No in S505), the execution unit 201 sets an identification number corresponding to the nonwork area 735 included in the replacement disk array unit 70 for the download destination designation parameter 2710. In addition, the execution unit 201 sets a version number of firmware stored in the work area 734 corresponding to the operation unit work area identification number 2703 for the version number designation parameter 2711. Furthermore, the execution unit 201 turns on the firmware download bit included in the mode parameter 2709 (S506), and then ends the process.

If it is determined in S501 that the identification number for the work area 734 included in the replacement disk array unit 70 and the identification number for the work area 834 included in the disk array unit 80 that is operating in the disk array apparatus 1 are the same, the execution unit 201 determines whether a version number of firmware stored in the work area 734 included in the replacement disk array unit 70 and a version number of firmware stored in the work area 834 included in the disk array unit 80 are the same (S507).

If the version numbers are the same (Yes in S507), the execution unit 201 performs processing of S511. On the other hand, if the version numbers are not the same (No in S507), the execution unit 201 sets an identification number corresponding to the work area 734 included in the replacement disk array unit 70 for the download destination designation parameter 2710 in the firmware control table 27. In addition, the execution unit 201 sets a version number of firmware stored in the work area 834 included in the disk array unit 80, which is specified on the basis of the operation unit work area identification number 2703, the operation unit area 1 firmware version number 2701, and the operation unit area 2 firmware version number 2702, for the version number designation parameter 2711. Furthermore, the execution unit 201 turns on the firmware download bit and the reboot bit which are included in the mode parameter 2709 (S508).

Subsequently, the execution unit 201 determines whether the replacement unit next work area identification number 2708 and an identification number for the work area 834 included in the disk array unit 80 that is operating in the disk array apparatus 1 are the same (S509).

If the identification numbers are the same (Yes in S509), the execution unit 201 ends the process. On the other hand, if the identification numbers are not the same (No in S509), the execution unit 201 sets the operation unit work area identification number 2703 for the work area change designation parameter 2712 in the firmware control table 27. In addition, the execution unit 201 turns on the work area change bit included in the mode parameter 2709 (S510), and then ends the process.

Next, the process performed when it is determined in S507 that the version number of firmware stored in the work area 734 included in the replacement disk array unit 70 and the version number of firmware stored in the work area 834 included in the disk array unit 80 that currently operates in the disk array apparatus 1 are the same (Yes in S507) will be described.

The execution unit 201 determines whether a version number of firmware stored in the nonwork area 735 included in the replacement disk array unit 70 and a version number of firmware stored in the nonwork area 835 included in the disk array unit 80 that is operating in the disk array apparatus 1 are the same (S511). If the version numbers are the same (Yes in S511), the execution unit 201 performs processing of S513. If the version numbers are not the same (No in S511), the execution unit 201 sets an identification number corresponding to the nonwork area 735 included in the replacement disk array unit 70 for the download destination designation parameter 2710 in the firmware control table 27. In addition, the execution unit 201 sets a version number of firmware stored in the nonwork area 835 included in the disk array unit 80 for the version number designation parameter 2711. Furthermore, the execution unit 201 turns on the firmware download bit included in the mode parameter 2709 (S512). Subsequently, the execution unit 201 determines whether the replacement unit next work area identification number 2708 and the operation unit next work area identification number 2704 are the same (S513). If the identification numbers are the same (Yes in S513), the execution unit 201 ends the process. On the other hand, if the identification numbers are not the same (No in S513), the execution unit 201 sets the operation unit next work area identification number 2704 for the work area change designation parameter 2712 in the firmware control table 27. In addition, the execution unit 201 turns on the work area change bit included in the mode parameter 2709 (S514), and then ends the process.

By performing the above-described processes, when a disk array unit is replaced while the disk array apparatus 1 is operating, the version numbers of a plurality of pieces of firmware stored in the storage areas in the replacement disk array unit 70 can be made to conform to the version numbers of a plurality of pieces of firmware stored in the storage areas in the disk array unit 80 that currently operates in the disk array apparatus 1 even if a disk array unit including a work area into which firmware can be downloaded and a disk array unit including a work area into which firmware cannot be downloaded are mixed in the disk array apparatus 1. In addition, an identification number for the work area 734 in the storage unit 73 included in the replacement disk array unit 70 can be made to conform to an identification number for the work area 834 in the storage unit 83 included in the disk array unit 80. Furthermore, a storage area to be set as the work area 734 after the replacement disk array unit 70 is rebooted can be made to conform to a work area to be set as the work area 834 included in the disk array unit 80. A disk array unit usually stores firmware of a new version number in its work area and stores firmware of an old version number in its nonwork area. Accordingly, even if a failure occurs in one of the disk array units included in the disk array apparatus 1, version numbers of all pieces of firmware stored in the disk array apparatus 1 can be easily changed.

In this embodiment, the disk array apparatus 1 is not configured to allow a plurality of disk array units disposed therein to be replaced at the same time. In order to replace a plurality of disk array units at the same time, the disk array apparatus 1 may have the following configuration. The operation unit area 1 firmware version number 2701, the operation unit area 2 firmware version number 2702, the operation unit work area identification number 2703, the operation unit next work area identification number 2704, the replacement unit area 1 firmware version number 2705, the replacement unit area 2 firmware version number 2706, the replacement unit work area identification number 2707, the replacement unit next work area identification number 2708, the mode parameter 2709, the download destination designation parameter 2710, the version number designation parameter 2711, and the work area change designation parameter 2712, which are a plurality of pieces of unique information for each disk array unit and are included in the firmware control table 27, are prepared for each disc array unit. When the execution unit 201 in the CM 2 refers to the firmware control table 27, it refers to a portion pertaining to a plurality of pieces of unique information acquired from the replacement disk array unit 70 that is a current target to be processed. According to the above-described configuration, a plurality of disk array units can be replaced at the same time.

The storage unit included in a disk array unit according to an embodiment of the present invention has a plurality of storage areas so as to store a plurality of pieces of firmware. If a disk array unit including a work area into which firmware can be downloaded and a disk array unit including a work area into which firmware cannot be downloaded are mixed in the disk array apparatus, and if version numbers of a plurality of pieces of firmware stored in a disk array unit that is operating in the disk array apparatus and version numbers of a plurality of pieces of firmware stored in a replacement disk array unit are not the same, a CM writes firmware having the same version number as that of firmware stored in a work area included in the disk array unit that is operating in the disk array apparatus into a nonwork area in the storage unit included in the replacement disk array unit. Subsequently, the CM switches between a work area and the nonwork area in the replacement disk array unit so that the firmware stored in the nonwork area can be stored in the work area. Thus, the above-described method of making the version number of firmware stored in the work area included in the replacement disk array unit conform to the version number of firmware stored in the work area included in the disk array unit that currently operates in the disk array apparatus can be considered. However, in such a known method, matching of identification numbers for the work areas in individual storage unit is not taken into consideration. Some disk array apparatuses contain 100 or more disk array units. Firmware is downloaded into all disk array units included in one of such disk array apparatuses under development, and the disk array apparatus is restarted. After the disk array apparatus has been restarted, in order to determine whether all the disk array units have been actually restarted, it is required to check which storage area in storage unit each disk array unit performed processing before the disk array apparatus is restarted and to compare the check results of all the disk array units. It is difficult to determine which storage area each disk array unit performed processing before the disk array apparatus is restarted using the known method. In addition, the comparison of the check results of all the disk array units requires considerable labor. A disk array apparatus according to an embodiment of the present invention is configured to allow work areas included in individual disk array units to be matched, thereby improving the efficiency of the debugging processing.

In a known technique, when a replacement disk array unit is restarted after firmware has been downloaded thereinto, and then performs processing in accordance with the downloaded firmware, a disk array apparatus does not sometimes operate. For example, if the firmware is firmware for a disk array apparatus under development, a malfunction may occur in the disk array apparatus, so that the disk array apparatus may not be restarted. Accordingly, in order to restore the malfunctioning disk array apparatus, it is required to restore a work area in storage unit included in each disk array unit to the state thereof before the disk array apparatus is rebooted. This requires considerable labor. A disk array apparatus according to an embodiment of the present invention is configured to allow storage areas in storage unit included in disk array units which will be set as work areas after the disk array apparatus is restarted to be matched. Accordingly, even after the disk array apparatus is restarted, each disk array unit can be easily restored to the state thereof before the disk array apparatus is restarted.

If a malfunction occurs while a disk array apparatus is operating, it is required to investigate the cause of the malfunction. In order to recreate the situation in which the malfunction occurred in the disk array apparatus, it is required to restore the disk array apparatus to the state thereof when the malfunction occurred. Accordingly, it is also required to restore a work area in storage unit in each disk array unit included in the disk array apparatus to the state thereof when the malfunction occurred. This requires much time and effort. A disk array apparatus according to an embodiment of the present invention is configured to allow version numbers of individual pieces of firmware stored in work areas, individual pieces of running firmware, and individual pieces of firmware to be executed after the disk array apparatus is restarted to be matched. In addition, work areas in individual disk array units can be matched. Accordingly, the workload to perform debugging processing can be reduced.

What is claimed is:

1. A method for controlling a disk array apparatus having a plurality of units redundantly, each of the plurality of units including a first storage area and a second storage area, each of the first storage area and second storage area being stored firmware, respectively, each of the plurality of units executing the firmware stored in the first storage area, the method comprising:

detecting replacement of one of the plurality of units, the replaced unit including a first storage area and a second storage area, each of the first and second storage areas of the replaced unit being stored firmware, respectively;

starting the replaced unit so as to execute the firmware stored in the first storage area;

reading out a version of the firmware stored in the first storage area of the replaced unit and a version of the firmware stored in the first storage area of the plurality of units other than the replaced unit;
comparing the version of the firmware stored in the storage area of the replaced unit with the version of the firmware stored in the first storage area of each of the plurality of units other than the replaced unit;
writing, into the second storage area of the replaced unit, firmware having the version corresponding to the version of the firmware stored in the first storage area of the plurality of units other than the replaced unit when the version of the firmware stored in the first storage area of the replaced unit is different from the version of the firmware stored in the first storage area of the plurality of units other than the replaced unit during execution of the replaced unit;
restarting the replaced unit so as to execute the firmware stored in the second storage area after the firmware stored in the second storage area has been written to the firmware having the version corresponding to the version of the firmware stored in the first storage area of the plurality of units other than the replaced unit;
writing, into the first storage area of the replaced unit, the firmware having the version corresponding to the version of the firmware stored in the first storage area of the plurality of units other than the replaced unit by using the firmware stored in the second storage area of the replaced unit after the replaced unit has been restarted by using the firmware stored in the second storage area; and
restarting the replaced unit so as to execute the firmware stored in the first storage areas after the firmware stored in the first storage area has been written.

2. A disk array apparatus, comprising:
a plurality of units redundantly, each of the plurality of units including a first storage area and a second storage area, each of the first storage area and second storage area being stored firmware, respectively, each of the plurality of units executing the firmware stored in the first storage area; and
a processor executing a process including:
detecting replacement of one of the plurality of units, the replaced unit including a first storage area and a second storage area, each of the first and second storage areas of the replaced unit being stored firmware, respectively;
starting the replaced unit so as to execute the firmware stored in the first storage area;
reading out a version of the firmware stored in the first storage area of the replaced unit and a version of the firmware stored in the first storage area of the plurality of units other than the replaced unit;
comparing the version of the firmware stored in the storage area of the replaced unit with the version of the firmware stored in the first storage area of each of the plurality of units other than the replaced unit;
writing, into the second storage area of the replaced unit, firmware having the version corresponding to the version of the firmware stored in the first storage area of the plurality of units other than the replaced unit when the version of the firmware stored in the first storage area of the replaced unit is different from the version of the firmware stored in the first storage area of the plurality of units other than the replaced unit during execution of the replaced unit;
restarting the replaced unit so as to execute the firmware stored in the second storage area after the firmware stored in the second storage area has been written to the firmware having the version corresponding to the version of the firmware stored in the first storage area of the plurality of units other than the replaced unit;
writing, into the first storage area of the replaced unit, the firmware having the version corresponding to the version of the firmware stored in the first storage area of the plurality of units other than the replaced unit by using the firmware stored in the second storage area of the replaced unit after the replaced unit has been restarted by using the firmware stored in the second storage area; and
restarting the replaced unit so as to execute the firmware stored.

3. A non-transitory computer-readable recording medium that stores a computer program for controlling a disk array apparatus having a plurality of units redundantly, each of the plurality of units including a first storage area and a second storage area, each of the first storage area and second storage area being stored firmware, respectively, each of the plurality of units executing the firmware stored in the first storage area, the program when executed by a computer causes the computer to perform a method comprising:
detecting replacement of one of the plurality of units, the replaced unit including a first storage area and a second storage area, each of the first and second storage areas of the replaced unit being stored firmware, respectively;
starting the replaced unit so as to execute the firmware stored in the first storage area;
reading out a version of the firmware stored in the first storage area of the replaced unit and aversion of the firmware stored in the first storage area of the plurality of units other than the replaced unit;
comparing the version of the firmware stored in the storage area of the replaced unit with the version of the firmware stored in the first storage area of each of the plurality of units other than the replaced unit;
writing, into the second storage area of the replaced unit, firmware having the version corresponding to the version of the firmware stored in the first storage area of the plurality of units other than the replaced unit when the version of the firmware stored in the first storage area of the replaced unit is different from the version of the firmware stored in the first storage area of the plurality of units other than the replaced unit during execution of the replaced unit;
restarting the replaced unit so as to execute the firmware stored in the second storage area after the firmware stored in the second storage area has been written to the firmware having the version corresponding to the version of the firmware stored in the first storage area of the plurality of units other than the replaced unit;
writing, into the first storage area of the replaced unit, the firmware having the version corresponding to the version of the firmware stored in the first storage area of the plurality of units other than the replaced unit by using the firmware stored in the second storage area of the replaced unit after the replaced unit has been restarted by using the firmware stored in the second storage area; and
restarting the replaced unit so as to execute the firmware stored.

* * * * *

UNITED STATES PATENT AND TRADEMARK OFFICE
CERTIFICATE OF CORRECTION

PATENT NO. : 8,074,018 B2
APPLICATION NO. : 11/723153
DATED : December 6, 2011
INVENTOR(S) : Takashi Kawada et al.

It is certified that error appears in the above-identified patent and that said Letters Patent is hereby corrected as shown below:

Column 20, Line 32, In Claim 3, Delete "aversion" and insert -- a version --, therefor.

Signed and Sealed this
Twenty-seventh Day of March, 2012

David J. Kappos
*Director of the United States Patent and Trademark Office*